United States Patent [19]

Akiyama et al.

[11] Patent Number: 5,783,635
[45] Date of Patent: Jul. 21, 1998

[54] UNSATURATED POLYESTER RESIN COMPOSITION

[75] Inventors: Koichi Akiyama, Kamakura; Kenichi Morita, Fujisawa; Hideki Terada, Kamakura, all of Japan

[73] Assignee: Takeda Chemical Industries, Ltd., Osaka, Japan

[21] Appl. No.: 841,556

[22] Filed: Apr. 30, 1997

[30] Foreign Application Priority Data

May 9, 1996 [JP] Japan .................................. 8-114777

[51] Int. Cl.$^6$ .............................. C08F 8/00; C08L 67/06
[52] U.S. Cl. .......................... 525/168; 528/272; 528/300; 528/302; 528/303; 528/306; 528/308; 525/41; 525/43; 525/44; 525/168; 525/437; 525/445; 523/200; 523/202; 523/204; 523/205; 523/500; 524/492
[58] Field of Search .................................. 528/272, 300, 528/302, 303, 306, 308; 525/41, 43, 44, 168, 437, 445; 523/200, 202, 204, 205, 500; 524/492

[56] References Cited

FOREIGN PATENT DOCUMENTS 51-1276  1/1976  Japan .
62-64858  3/1987  Japan .

*Primary Examiner*—Samuel A. Acquah
*Attorney, Agent, or Firm*—Wenderoth, Lind & Ponack

[57] ABSTRACT

An unsaturated polyester resin composition which comprises 100 parts by weight of a resin mixture comprising 25 to 80 parts by weight of an unsaturated polyester, 20 to 60 parts by weight of a comonomer and 1 to 10 parts by weight of a particulate crosslinked polymer and 100 to 400 parts by weight of an inorganic filler and in which the difference in refractive index between a product of copolymerization of the unsaturated polyester with the comonomer and the inorganic filler is 0.02 or below; and molded articles produced by curing the resin composition by heating under pressure. The resin composition has a high productivity, exhibits a texture excellent in both light transmittance and gloss, and is excellent in water resistance and which is suitable for the production of artificial marble.

7 Claims, 1 Drawing Sheet

1

UNSATURATED POLYESTER RESIN COMPOSITION

BACKGROUND OF THE INVENTION

1. Field of the Invention

The present invention relates to a resin composition which has an appearance like natural marble, a high productivity, a depth based on excellent transparency and gloss, and an excellent water resistance and which is suitable for the production of artificial marble, and to articles molded from the resin composition which are excellent in transparency and have extremely beautiful appearances.

2. Description of the Prior Art

Molded articles having an appearance like marble have recently been used in various kinds of products such as bathtubs, aprons, counters, sinks or the like. Such molded articles have been produced by casting. However, casting method is extremely low in productivity, so that it has been expected to develop molding compounds having beautiful appearances, excellent transparency and high producibility.

Meanwhile, SMC (sheet molding compound) and BMC (bulk molding compound) are frequently used as molding compounds. These molding compounds are extremely excellent in productivity and are molded by compression molding or injection molding under heat and pressure. When a resin composition prepared in a manner practiced in a conventional casting process is molded into a relatively big part by the above high-productivity molding process, the parts suffered from cracks to result in poor water resistance and deteriorated surface color and gloss, thus being practically unusable.

In order to improve the moldability of such a resin composition, it is necessary to decrease the strain due to the curing shrinkage of the resin. Generally, there is a process of decreasing the molding shrinkage of a resin composition by adding a thermoplastic resin as a. low profile additive. However, this process is liable to give molded articles which are remarkably lowered in transparency and therefore impair the appearance like marble, though the process can attain the good moldability. With respect to such a disadvantage, Japanese Patent Publication No. 51-1276(1976) and Japanese Patent Laid-Open No. 62-64858(1987) disclose that the use of a crosslinked polymer decreases the curing shrinkage without impairing the transparency. However, even this method makes it difficult to produce molded articles having both sufficient transparency and excellent water resistance.

SUMMARY OF THE INVENTION

The present invention aims at providing a molding resin composition which has a high productivity, a depth caused by good transparency and gloss, an appearance like natural marble, and an excellent water resistance and endurance, and articles molded from the resin composition which have extremely beautiful appearances and excellent endurance.

The inventors of the present invention have intensively studied to find that when an unsaturated polyester resin, a comonomer and an inorganic filler are selected so that the difference in refractive index between a product of copolymerization of the unsaturated polyester with the comonomer and the inorganic filler is 0.02 or below and 1 to 10 parts by weight of a particulate crosslinked polymer is further added thereto, the resulting material is decreased in the strain due to curing shrinkage without any adverse effect on the transparency, etc., of molded articles, enabling the stable production of large-size molded articles free from cracking. Further, it has also been found that articles molded from the composition are extremely excellent in appearance and has beautiful appearance like natural marble and excellent long-term water resistance.

Namely, the present invention includes the following aspects (1) to (7).

(1) An unsaturated polyester resin composition which comprises 100 parts by weight of a resin mixture comprising 25 to 80 parts by weight of an unsaturated polyester, 20 to 60 parts by weight of a comonomer and 1 to 10 parts by weight of a particulate crosslinked polymer and 100 to 400 parts by weight of an inorganic filler and in which the difference in refractive index between a product of copolymerization of the unsaturated polyester with the comonomer and the inorganic filler is 0.02 or below.

(2) A resin composition as set forth in item (1), wherein the unsaturated polyester is a product of the reaction among isophthalic acid, fumaric acid, hydrogenated bisphenol A, neopentyl glycol and 1,6-hexanediol.

(3) A resin composition as set forth in item (1), wherein the particulate crosslinked polymer is one surface-coated with an inorganic substance.

(4) A resin composition as set forth in item (1), wherein the inorganic substance with which the particulate crosslinked polymer is surface-coated is aluminum hydroxide and/or tricalcium diphosphate.

(5) A resin composition as set forth in item (1), wherein the difference in refractive index between a product of copolymerization of the unsaturated polyester with the comonomer and the inorganic filler is 0.01 or below.

(6) A resin composition as set forth in item (1), wherein the inorganic filler is glass powder or aluminum hydroxide.

(7) Molded articles produced by curing the resin composition as set forth in item (1) by heating under pressure.

BRIEF DESCRIPTION OF THE DRAWING

The single FIGURE is a schematic illustration of a plan view and front view of the miniature bathtub.

DETAILED DESCRIPTION OF THE PREFERRED EMBODIMENTS

Figure 1:
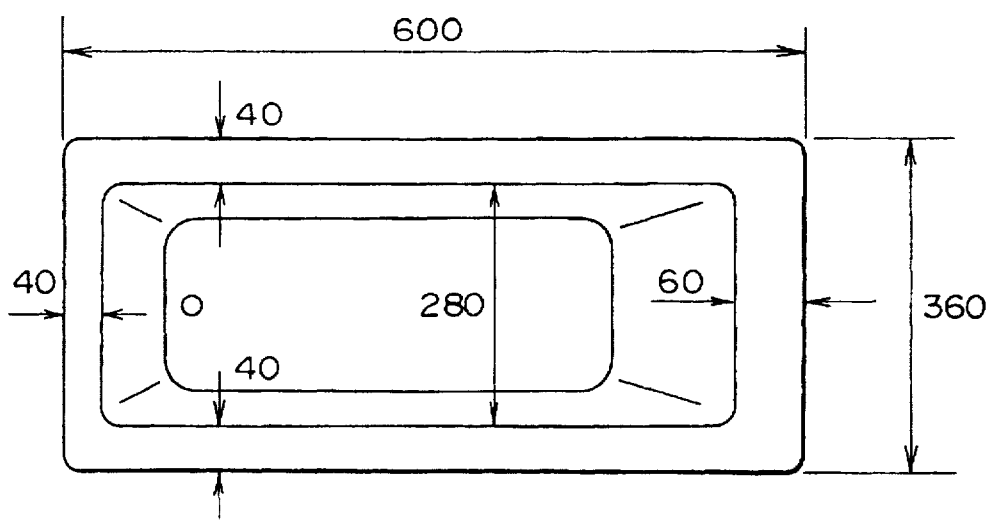
Figure 2:
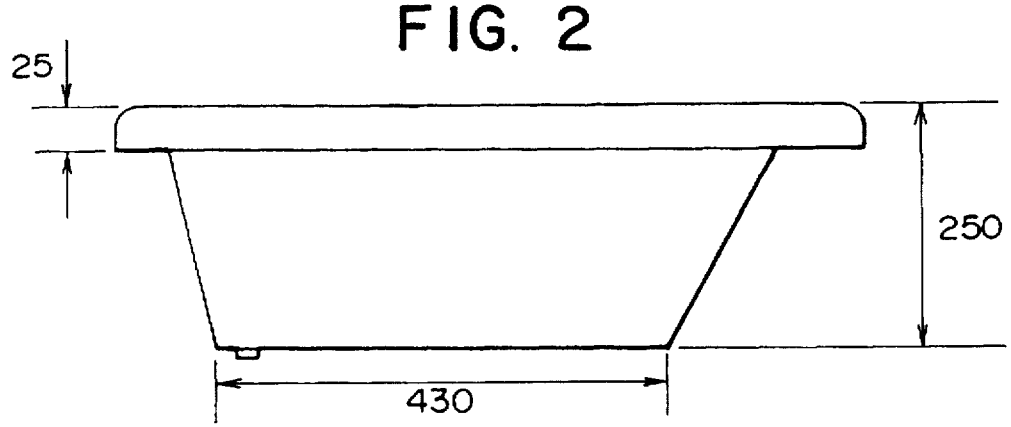

The unsaturated polyester to be used in the present invention can be prepared by the condensation reaction of an $\alpha,\beta$-olefinic unsaturated dicarboxylic acid (or an anhydride thereof) with a glycol or the condensation of such an acid with a glycol through dehydration. In this preparation, other suitable compounds may be used in addition to the above compounds. As examples of such compounds, saturated dicarboxylic acids, aromatic dicarboxylic acids or anhydrides thereof may be used with the above dicarboxylic acid and dicyclopentadiene reactive with carboxylic acids may be used with the glycol. Examples of the $\alpha,\beta$-olefinic unsaturated dicarboxylic acid include maleic acid, fumaric acid, itaconic acid, citraconic acid and anhydrides of these dicarboxylic acids. Examples of the dicarboxylic acid to be used simultaneously with the $\alpha,\beta$-olefinic unsaturated dicarboxylic acid include adipic acid, sebacic acid, succinic acid, phthalic anhydride, orthophthalic acid, isophthalic acid, terephthalic acid, tetrahydrophthalic acid and tetrachlorophthalic acid. In particular, it is preferable to use fumaric acid as the $\alpha,\beta$-olefinic unsaturated dicarboxylic acid simultaneously with isophthalic acid as the dicarboxylic acid.

In the present invention, at least one glycol selected among the glycols which will now be described can be used. The diol to be used in the present invention includes alkanediols, oxaalkanediols, hydrogenated bisphenol A, adducts of bisphenol A with ethylene oxide or propylene oxide, and products of hydrogenation of the adducts. Monools or triols may be used in addition to the diol. Examples of the alkanediols include ethylene glycol, 1,2-propylene glycol, 1,3-propylene glycol, 1,3-butanediol, 1,4-butanediol, neopentyl glycol, 1,5-pentanediol, 1,6- hexanediol and cyclohexanediol. Examples of the oxaalkanediols include diethylene glycol, triethylene glycol, dipropylene glycol and tripropylene glycol. The monool and triol to be used simultaneously with the glycol include octyl alcohol, oleyl alcohol and trimethylolpropane. In particular, it is preferable to use hydrogenated bisphenol A, neopentyl glycol and 1,6-hexanediol simultaneously.

The synthesis of the unsaturated polyester is generally conducted under heating and the reaction is proceeded by removing water formed as a by-product. The unsaturated polyester to be used in the present invention is generally one having a number-average molecular weight of 800 to 10000 and an acid value of 5 to 50. In preparing the resin composition, the unsaturated polyester is generally used as an unsaturated polyester resin obtained by dissolving the unsaturated polyester in a comonomer which will be described below. Although the present invention can be carried out by using only one unsaturated polyester resin selected with regard to the refractive index, two or more unsaturated polyester resins may be mixed to adjust the refractive index.

In the present invention, at least one vinyl compound is used as the comonomer. Examples of the vinyl compounds include aromatic vinyl monomers such as styrene, p-chlorostyrene and vinyltoluene; and acrylic compound such as acrylic acid, methyl acrylate, methacrylic acid, methyl methacrylate and acrylonitrile. The comonomer may be added not only as the diluent for the unsaturated polyester but also in formulating the resin composition.

Further, a polyvalent copolymerizable compound may be used in combination with the above monofunctional vinyl monomer. Examples of the polyvalent copolymerizable compound include dimethacrylates and diacrylates of $C_2-C_{12}$ alkanepolyols such as ethylene glycol dimethacrylate, diethylene glycol dimethacrylate, triethylene glycol dimethacrylate, propylene glycol dimethacrylate, dipropylene glycol dimethacrylate, 1,4-butanediol dimethacrylate, neopentyl glycol dimethacrylate, 1,6-hexanediol dimethacrylate, ethylene glycol diacrylate, 1,3-propanediol diacrylate, 1,4-butanediol diacrylate, neopentyl glycol diacrylate, 1,6-hexanediol diacrylate, trimethylolpropane dimethacrylate, glycerol dimethacrylate, pentaerythritol dimethacrylate and trimethylolpropane diacrylate. Although the present invention can be carried out by using only one comonomer selected with regard to the refractive index, two or more comonomers may be combined to regulate the refractive index.

Examples of the polyvalent copolymerizable compound also include polymethacrylates and polyacrylates of $C_3-C_{12}$ alkanepolyols such as trimethylolpropane trimethacrylate, glycerol trimethacrylate, dipentaerythritol hexamethacrylate, pentaerythritol tetraacrylate and dipentaerythritol hexaacrylate.

The particulate crosslinked polymer to be used in the present invention is a copolymer of at least one monofunctional vinyl monomer and at least one polyfunctional vinyl monomer. Examples of the monofunctional vinyl monomer include aromatic vinyl compounds such as styrene, α-methylstyrene, chlorostyrene, vinyltoluene and ethylvinylbenzene; conjugated dienes such as butadiene, isoprene and chloroprene; (meth)acrylates such as ethyl acrylate, propyl acrylate, butyl acrylate, cyclohexyl acrylate, 2-ethylhexyl acrylate, methyl methacrylate and butyl methacrylate; vinyl esters such as vinyl acetate and vinyl propionate; vinyl cyanides such as acrylonitrile and methacrylonitrile; and vinylidene cyanide. In the present invention, it is preferable to use, as the monofunctional vinyl monomer, one selected from among styrene, methyl methacrylate and vinyl acetate, still preferably styrene. On the other hand, examples of the polyfunctional vinyl monomer include aromatic divinyl monomers such as divinylbenzene; and polymethacrylates of alkanepolyols such as ethylene glycol diacrylate, ethylene glycol dimethacrylate, butylene glycol diacrylate, hexanediol diacrylate, hexanediol dimethacrylate, trimethylolpropane diacrylate, trimethylolpropane dimethacrylate, trimethylolpropane triacrylate and trimethylolpropane trimethacrylate. It is preferable in the present invention to use divinylbenzene, butylene glycol diacrylate or hexanediol diacrylate.

The particulate crosslinked polymer to be used in the present invention is preferably one having a mean particle diameter of 5 to 100 μm, particularly preferably about 50 μm. When the mean particle diameter is less than 5 μm, the resulting composition will be too viscous to attain sufficient impregnation, while when it exceeds 100 μm, the resulting molded article will be poor in surface smoothness.

If necessary, the particulate crosslinked polymer may be surface-coated with one or more inorganic substances selected from among silica, alumina, calcium carbonate, magnesium silicate, aluminum silicate, aluminum hydroxide, tricalcium diphosphate and so on. Among these inorganic substances, aluminum hydroxide and/or tricalcium diphosphate is preferable. Further, the particle diameter of the inorganic substance is preferably 1 to 10 μm, and it is preferable that the inorganic substance be treated with a silane coupling agent or titanium coupling agent prior to the application to the particulate crosslinked polymer.

The inorganic filler to be used in the present invention is preferably glass powder or aluminum hydroxide having a mean particle diameter of 5 to 50 μm. Further, it is also preferable to use an inorganic filler treated with a surface modifier such as a silane coupling agent or titanium coupling agent.

In the present invention, the difference in refractive index between a product of copolymerization of the unsaturated polyester with the comonomer and the inorganic filler must be 0.02 or below, preferably 0.01 or below.

The resin composition of the present invention may further contain various additives in suitable amounts, as far as the performance of the composition is not impaired. Such additives include curing agents, inhibitors, internal mold release agents, pigments, thickening agents, fibrous reinforcements and so on.

The curing agent used in the present invention may be selected from among known organic peroxides depending upon the molding cycle. The curing agent to be incorporated into the resin composition may be at least one member selected from among organic peroxides such as t-butyl peroxybenzoate (TBPB), t-butyl peroxyoctoate (TBPO), t-hexyl peroxybenzoate (THPB), t-hexyl peroxyoctoate (THPO), 2,5-dimethyl-2,5-di(benzoylperoxy)cyclohexane (DDBPH), t-amyl peroxyoctoate (TAPO) and t-butyl isopropyl peroxycarbonate (TBIPC) depending upon the desired curing speed, which is added generally in an amount of 0.3 to 4 parts by weight per 100 parts by weight of the polyester resin.

Further, a known cure accelerator may be used simultaneously with the curing agent. Examples of the cure accelerator include organometallic compounds of cobalt, copper and manganese such as octoates, naphthenates and acetylacetonates of these metals. These organometallic compounds may be used each alone or as a mixture of two or more of them. The cure accelerator is generally used in an amount of 20 to 200 ppm per 100 parts of the resin mixture.

The inhibitor to be used in the present invention may be any known one. Examples thereof include PBQ (p-benzoquinone), MTBHQ (mono-t-butylhydroquinone), BHT (di-t-butylhydroxytoluene or 2,5-di-t-butyl-4-methylphenol), HQ (hydroquinone) and TBC (t-butylcatechol), which may be used each alone or as a mixture of two or more of them.

The internal mold release agent to be used in the present invention may be any known one. Examples thereof include metal soaps such as zinc stearate and calcium stearate; fluorine-containing organic compounds; and phosphate compounds.

The pigment to be used in the present invention may be any known one. Examples thereof include titanium oxide, carbon black, iron red oxide, phthalocyanine blue and so on.

The thickening agent to be used in the present invention may be any known one. Examples thereof include oxides and hydroxides of magnesium, calcium and so on.

The fibrous reinforcement to be used in the present invention may be any known one. It is generally preferable to use glass fibers having a diameter of about 8 to 15 μm and a length of 13 mm or below. The fibrous reinforcement is added generally in an amount of 0 to 20% by weight based on the total amount of the composition.

The compound of the present invention can be prepared from the components described above as SMC (sheet molding compound), TMC (thick molding compound) or BMC (bulk molding compound) by conventional mixing and impregnation procedure. When a thickening agent is used, the compound prepared is matured, usually at 30 to 40° C. for 2 to 3 days, until the viscosity of the compound becomes high enough to be molded, and thereafter subjected to molding.

The molded articles of the unsaturated polyester resin composition according to the present invention can be produced by heating and pressing the above unsaturated polyester resin composition in a compression molding machine or injection molding machine at a predetermined temperature under a predetermined pressure. For example, it can be produced by curing the composition under a pressure of 1 to 12 MPa at a temperature of 80° to 160° C.

The present invention will now be described by referring to the following Examples and Comparative Examples, though the present invention is not limited thereto at all. In the Examples and Comparative Examples, all parts are by weight.

Examples 1 to 9 and Comparative Examples 1 to 8

The unsaturated polyester resin A used in the inventive examples and comparative examples was one prepared by the condensation reaction among isophthalic acid, fumaric acid, propylene glycol and neopentyl glycol at a mole ratio of 30:70:30:70 to form the unsaturated polyester A (UP-A) having an acid value of 25 mgKOH/g and a number-average molecular weight of 5500, and dissolving UP-A in styrene so that the concentration of the unsaturated polyester in the resin was 67%. The unsaturated polyester resin B was one prepared by the condensation reaction among fumaric acid, hydrogenated bisphenol A and propylene glycol at a mole ratio of 100:30:70 to form the unsaturated polyester B (UP-B) having an acid value of 23 mgKOH/g and a number-average molecular weight of 3700, and dissolving UP-B in styrene so that the concentration of the unsaturated polyester in the resin was 50%. The unsaturated polyester resin C was one prepared by the condensation reaction among isophthalic acid, fumaric acid, hydrogenated bisphenol A, neopentyl glycol and 1,6-hexanediol at a mole ratio of 40:60:30:50:20 to form the unsaturated polyester C (UP-C) having an acid value of 33 mgKOH/g and a number-average molecular weight of 2500, and dissolving UP-C in styrene so that the concentration of the unsaturated polyester in the resin was 67%. The unsaturated polyester resin D is one prepared by conducting the reaction between maleic anhydride and propylene glycol at a mole ratio of 100:107 to form the unsaturated polyester D (UP-D) having an acid value of 35 mgKOH/g and a number-average molecular weight of 4800, and dissolving UP-D in styrene so that the concentration of the unsaturated polyester resin was 67%. The unsaturated polyester resin E was one prepared by conducting the reaction among dicyclopentadiene, maleic anhydride and propylene glycol at a mole ratio of 20:100:100 to form the unsaturated polyester E (UP-E) having an acid value of 25 mgKOH/g and a number-average molecular weight of 3600, and dissolving UP-E in styrene so that the concentration of the unsaturated polyester in the resin was 67%.

Staphyloid GS30A and GS60A (products of Takeda Chemical Industries, Ltd.) were used as the crosslinked polymer. GS30A and GS60A are crosslinked polystyrene made from styrene and divinylbenzene, and have mean particle diameters of 20 μm and 50 μm, respectively. Both of them have been surface-treated with aluminum hydroxide.

The fillers used were glass powder having a mean particle diameter of 20 μm, aluminum hydroxide having a mean particle diameter of 20 μm and calcium carbonate having a mean particle diameter of 10 μm.

Mono-t-butylhydroquinone (MTBHQ) was used as the inhibitor; t-butyl peroxybenzoate (TBPB) and t-butyl peroxy-2-ethylhexanoate (TBPO) were used as the polymerization initiator; zinc stearate (ZnSt) as the mold release agent; magnesium oxide as the thickening agent; and glass fiber as the fibrous reinforcement.

The formulations and results of Examples and Comparative Examples are given in Tables 1 and 2. Although the unsaturated polyesters A to E were used as their respective solutions in styrene (i.e., as unsaturated polyester resins A to E), the amounts of them are given in the items of unsaturated polyester and styrene to specify the ratio between them.

Table 1 shows the formulations and results of Examples. Each BMC was prepared by a conventional process. More precisely, the raw materials, excluding a thickening agent and glass fibers, were thoroughly mixed to form each resin paste. A thickening agent and glass fibers were added to the resin paste and further sufficiently kneaded. The BMC thus prepared was matured at 40° C. for 72 hours. The matured BMC was heated and pressed under the conditions of 120° C. and 10 MPa for 7 minutes to form a molded article having a thickness of 8 mm. The rate of molding shrinkage of this molded article was calculated from the rate (%) of the difference between the sizes of the mold and article to the size of the mold i.e., $$\frac{(\text{size of mold} - \text{size of article})}{\text{size of mold}} \times 100(\%),$$

at room temperature. The appearance of the article and the water resistance were evaluated by immersing a test piece in hot water at 90° C., and determining changes in the color, gloss and light transmittance thereof after 300, 500 and 1000 hours. The color, light transmittance and gloss were measured using a color measuring system Σ80 (mfd. by Nippon Denshoku Ind. Co. Ltd.), a turbidimeter 300 A (mfd. by Nippon Denshoku Ind. Co. Ltd.), and a glossmeter 1G-310 (mfd. by Horiba Seisakusho Co. Ltd.), respectively. Change (ΔE) in the color was calculated from the L, a and b values of the color thus determined, and retentions of the light transmittance and the gloss were calculated from the measured values of the light transmittance and the gloss, respectively.

TABLE 1

| Example | 1 | 2 | 3 | 4 | 5 | 6 | 7 | 8 | 9 |
|---|---|---|---|---|---|---|---|---|---|
| UP-A | 63 | 53 | 63 | — | 53 | 63 | 65 | 60 | — |
| UP-B | — | — | — | — | 10 | — | — | — | 63 |
| UP-C | — | — | — | 63 | — | — | — | — | — |
| GS-30A | 5 | 5 | 5 | 5 | 5 | — | 2 | 9 | 5 |
| GS-60A | — | — | — | — | — | 5 | — | — | — |
| styrene | 32 | 42 | 32 | 32 | 32 | 32 | 33 | 31 | 32 |
| glass powder | 300 | 300 | 150 | 300 | 300 | 300 | 300 | 300 | — |
| aluminum hydroxide | — | — | — | — | — | — | — | — | 300 |
| MTBHQ | 0.03 | 0.03 | 0.03 | 0.03 | 0.03 | 0.03 | 0.03 | 0.03 | 0.03 |
| TBPB | 0.5 | 0.5 | 0.5 | 0.5 | 0.5 | 0.5 | 0.5 | 0.5 | 0.5 |
| TBPO | 0.5 | 0.5 | 0.5 | 0.5 | 0.5 | 0.5 | 0.5 | 0.5 | 0.5 |
| ZnSt | 4 | 4 | 4 | 4 | 4 | 4 | 4 | 4 | 4 |
| glass fiber | 10 | 10 | 10 | 10 | 10 | 10 | 10 | 10 | 10 |
| refractive index of cured resin* | 1.542 | 1.564 | 1.542 | 1.551 | 1.544 | 1.543 | 1.542 | 1.542 | 1.581 |
| refractive index of filler | 1.554 | 1.554 | 1.554 | 1.554 | 1.554 | 1.554 | 1.554 | 1.554 | 1.578 |
| difference in refractive index | 0.012 | 0.010 | 0.012 | 0.003 | 0.010 | 0.011 | 0.012 | 0.012 | 0.003 |
| rate of molding shrinkage (%) | 0.350 | 0.348 | 0.352 | 0.353 | 0.348 | 0.359 | 0.373 | 0.304 | 0.349 |
| moldability | good | good | good | good | good | good | good | good | good |
| light transmittance (%) | 20.8 | 22.1 | 25.7 | 23.8 | 22.7 | 21.2 | 21.9 | 20.1 | 23.6 |
| gloss (%) | 92.0 | 91.0 | 91.0 | 92.0 | 92.0 | 91.0 | 91.0 | 91.0 | 92.0 |
| texture | good | good | good | good | good | good | good | good | good |
| resistance to hot water 300 h | | | | | | | | | |
| ΔE | 0.99 | 0.87 | 0.92 | 0.93 | 1.04 | 1.06 | 0.99 | 0.97 | 0.88 |
| retention of gloss (%) | 98.8 | 97.6 | 99.9 | 98.7 | 98.7 | 98.6 | 99.1 | 98.4 | 97.4 |
| retention of light transmittance (%) | 97.4 | 96.2 | 98.6 | 97.4 | 96.5 | 98.3 | 97.4 | 98.1 | 97.7 |
| resistance to hot water 500 h | | | | | | | | | |
| ΔE | 1.47 | 1.32 | 1.55 | 1.41 | 1.39 | 1.47 | 1.52 | 1.47 | 1.38 |
| retention of gloss (%) | 94.5 | 96.6 | 92.1 | 95.1 | 96.2 | 94.4 | 95.4 | 93.4 | 92.8 |
| retention of light transmittance (%) | 93.1 | 94.5 | 95.2 | 94.8 | 93.3 | 94.1 | 95.5 | 96.1 | 94.7 |
| resistance to hot water 1000 h | | | | | | | | | |
| ΔE | 3.23 | 3.45 | 3.41 | 3.33 | 3.44 | 3.47 | 3.35 | 3.41 | 3.48 |
| retention of gloss (%) | 89.1 | 91.3 | 88.7 | 87.2 | 89.4 | 90.1 | 91.3 | 87.6 | 86.9 |
| retention of light transmittance (%) | 90.2 | 89.1 | 92.4 | 87.4 | 86.9 | 87.4 | 90.1 | 91.1 | 89.9 |
| overall evaluation of water resistance | good | good | good | good | good | good | good | good | good |

*Refractive index of eash resin cured product of unsaturated polyester(s) and styrene Each BMC was examined for moldability in a miniature bathtub shown in the drawing (dimensional unit: mm) by heating and pressing it at 120° C. and 10 MPa for 7 minutes.

The resin compositions of Examples exhibited a rate of molding shrinkage of 0.350% or below in molding and thus attained good moldability not accompanied with deformation such as warpage. Further, the articles molded therefrom exhibited high light transmittances exceeding 20% which was the level essential to artificial marble, good textures having a satisfactory depth, and very beautiful appearances.

Table 2 shows the formulations and results of Comparative Examples. Each BMC was prepared, and evaluated for moldability in a similar method to those of Examples.

TABLE 2

| Comparative Example | 1 | 2 | 3 | 4 | 5 | 6 | 7 | 8 |
|---|---|---|---|---|---|---|---|---|
| UP-A | 63 | 57 | — | — | — | 63 | 63 | — |
| UP-B | — | — | — | 63 | — | — | — | — |
| UP-D | — | — | 63 | — | — | — | — | 63 |
| UP-E | — | — | — | — | 63 | — | — | — |
| GS-30A | — | 13 | 5 | 5 | 5 | 5 | 5 | 5 |
| styrene | 37 | 30 | 32 | 32 | 32 | 32 | 32 | 32 |
| glass powder | 300 | 300 | 300 | 300 | 300 | — | — | — |
| aluminum hydroxide | — | — | — | — | — | 300 | — | — |
| calcium carbonate | — | — | — | — | — | — | 300 | 300 |
| MTBHQ | 0.03 | 0.03 | 0.03 | 0.03 | 0.03 | 0.03 | 0.03 | 0.03 |
| TBPB | 0.5 | 0.5 | 0.5 | 0.5 | 0.5 | 0.5 | 0.5 | 0.5 |
| TBPO | 0.5 | 0.5 | 0.5 | 0.5 | 0.5 | 0.5 | 0.5 | 0.5 |
| ZnSt | 4 | 4 | 4 | 4 | 4 | 4 | 4 | 4 |
| glass fiber | 10 | 10 | 10 | 10 | 10 | 10 | 10 | 10 |
| refractive index of cured resin* | 1.542 | 1.539 | 1.527 | 1.532 | 1.581 | 1.542 | 1.542 | 1.527 |
| refractive index of filler | 1.554 | 1.554 | 1.554 | 1.554 | 1.554 | 1.578 | 1.481 | 1.481 |
| difference in refractive index | 0.012 | 0.015 | 0.027 | 0.027 | 0.022 | 0.036 | 0.061 | 0.046 |

TABLE 2-continued

| Comparative Example | 1 | 2 | 3 | 4 | 5 | 6 | 7 | 8 |
|---|---|---|---|---|---|---|---|---|
| rate of molding shrinkage (%) | 0.470 | 0.247 | 0.356 | 0.362 | 0.361 | 0.354 | 0.358 | 0.361 |
| moldability | crack | good | good | good | good | good | good | good |
| light transmittance (%) | 21.2 | 15.3 | 14.8 | 13.6 | 16.4 | 13.4 | 1.4 | 2.1 |
| gloss (%) | 91.0 | 83.0 | 91.0 | 90.0 | 91.0 | 91.0 | 85.0 | 85.0 |
| texture | good | bad | bad | bad | bad | bad | bad | bad |
| resistance to hot water 300 h | | | | | | | | |
| ΔE | 0.89 | 2.12 | 0.98 | 0.87 | 0.88 | 0.95 | 1.54 | 1.67 |
| retention of gloss (%) | 97.6 | 90.2 | 96.4 | 96.8 | 97.6 | 95.2 | 87.6 | 82.4 |
| retention of light transmittance (%) | 96.2 | 88.6 | 97.4 | 96.3 | 97.2 | 95.5 | 90.2 | 87.5 |
| resistance to hot water 500 h | | | | | | | | |
| ΔE | 1.44 | 3.78 | 1.54 | 1.37 | 1.41 | 1.45 | 2.41 | 2.28 |
| retention of gloss (%) | 91.4 | 71.4 | 91.2 | 90.3 | 94.4 | 90.1 | 75.7 | 73.1 |
| retention of light transmittance (%) | 91.4 | 68.4 | 94.3 | 92.2 | 93.4 | 91.1 | 88.9 | 85.1 |
| resistance to hot water 1000 h | | | | | | | | |
| ΔE | 3.25 | 7.89 | 3.34 | 3.48 | 3.33 | 3.45 | 4.85 | 5.12 |
| retention of gloss (%) | 87.4 | 57.3 | 89.4 | 87.7 | 90.1 | 86.4 | 63.2 | 56.4 |
| retention of light transmittance (%) | 86.1 | 42.1 | 87.4 | 88.7 | 86.1 | 85.4 | 85.3 | 82.2 |
| overall evaluation of water resistance | good | bad | good | good | good | good | bad | bad |

*Refractive index of eash resin cured product of unsaturated polyester(s) and styrene Comparative Examples 1 and 2 are deviated from the range of the present invention in the content of the crosslinked polymer which is essential to the present invention. Comparative Examples 3 to 8 are deviated from the range of the present invention in the difference in refractive index between the cured resin and the filler. The resin compositions of Comparative Examples were disadvantageous in that molding was difficult because of significant rate of mold shrinkage, that the light transmittance was so poor as to result in a poor appearance, and/or that the water resistance was poor.

As described above, the resin composition of the present invention exhibits a very beautiful appearance and an extremely stable moldability. Further, it can easily be prepared by conventional processes. Furthermore, it can easily be molded into beautiful articles having a feel like marble even by hot-press molding in a high productivity without causing cracking or any other trouble.

The resin composition is excellent in light transmittance and retention thereof and in water resistance and the molded articles thereof are excellent in endurance.

What is claimed is:

1. An unsaturated polyester resin composition which comprises 100 parts by weight of a resin mixture comprising 25 to 80 parts by weight of an unsaturated polyester, 20 to 60 parts by weight of a comonomer and 1 to 10 parts by weight of a particulate crosslinked polymer and 100 to 400 parts by weight of an inorganic filler and in which the difference in refractive index between a product of copolymerization of the unsaturated polyester with the comonomer and the inorganic filler is 0.02 or below.

2. A resin composition according to claim 1, wherein the unsaturated polyester is a product of the reaction among isophthalic acid, fumaric acid, hydrogenated bisphenol A, neopentyl glycol and 1,6-hexanediol.

3. A resin composition according to claim 1, wherein the particulate crosslinked polymer is one surface-coated with an inorganic substance.

4. A resin composition according to claim 1, wherein the inorganic substance with which the particulate crosslinked polymer is surface-coated is aluminum hydroxide and/or tricalcium diphosphate.

5. A resin composition according to claim 1, wherein the difference in refractive index between a product of copolymerization of the unsaturated polyester with the comonomer and the inorganic filler is 0.01 or below.

6. A resin composition according to claim 1, wherein the inorganic filler is glass powder or aluminum hydroxide.

7. Molded articles produced by curing the resin composition according to claim 1 by heating under pressure.

* * * * *